United States Patent [19]

Rousseau

[11] 4,442,986
[45] Apr. 17, 1984

[54] LEADING EDGE AUGMENTOR WING-IN-GROUND EFFECT VEHICLE

[75] Inventor: David G. Rousseau, Bethesda, Md.

[73] Assignee: The United States of America as represented by the Secretary of the Navy, Washington, D.C.

[21] Appl. No.: 413,182

[22] Filed: Aug. 30, 1982

[51] Int. Cl.³ ............................................. B64C 21/04
[52] U.S. Cl. .................................. 244/12.1; 180/116; 244/207
[58] Field of Search ................... 244/12.1, 12.3, 23 R, 244/23 B, 207, 2; 180/116, 118, 121, 126

[56] References Cited

U.S. PATENT DOCUMENTS

| | | | |
|---|---|---|---|
| 3,045,947 | 7/1962 | Bertin et al. | 244/12.1 |
| 3,124,322 | 3/1964 | Cockerell | 244/12.1 |
| 3,135,480 | 6/1964 | Chaplin | 244/12.1 |
| 3,412,956 | 1/1968 | Cockerell | 244/2 |
| 3,545,701 | 12/1970 | Bertin et al. | 244/12.3 |
| 3,640,486 | 2/1972 | Bertin | 244/12.1 |
| 3,770,227 | 11/1973 | Von Chain et al. | 244/207 |
| 4,151,893 | 5/1979 | Mantle | 244/23 R |

Primary Examiner—Galen L. Barefoot
Attorney, Agent, or Firm—R. F. Beers; L. A. Marsh; R. F. Gnuse

[57] ABSTRACT

A Wing-in-Ground (WIG) effect vehicle for traveling over water utilizing the efflux from propulsors to create a static pressure increase under the wings. The propulsors are carried inside the fuselage or in other safe locations away from sea spray and debris. The efflux is carried by conduit running the full span of the wing leading edge and is directed under the wing. The efflux also entrains ambient air by Coanda effect to increase the resultant lift.

2 Claims, 6 Drawing Figures

LEADING EDGE AUGMENTOR WING-IN-GROUND EFFECT VEHICLE

BACKGROUND OF THE INVENTION

1. Field of the Invention

This invention relates to a Wing-in-Ground effect (WIG) vehicle and more particularly to a WIG vehicle having a power augmentor along the leading edge of the wings.

2. Description of the Prior Art

Ground effect vehicles include any device which travels on a cushion of air which is trapped beneath the body of the vehicle. Some of the more common forms of ground effect machines include hovercraft which have even become commercially feasible. A less common form of ground effect machine is an aircraft which traps an air cushion under its wings. This vehicle is referred to as a Wing-in-Ground effect (WIG) vehicle.

Since the first WIG device was designed in 1935, various attempts have been made to develop a feasible WIG machine. Traditionally, the air trapped under the wing is the result of the aircraft moving forward utilizing a ram effect to produce enough pressure to form an air cushion. This ram effect was utilized in the device shown in U.S. Pat. No. 3,135,480 to create the cushion of air necessary to lift the aircraft. This device also used the efflux from the propulsion system to create a "curtain" of air to contain the cushion in place of a rigid end plate. When the device is hovering, there is no ram force and most of the propulsion efflux is used to create the cushion. In the hovering mode, a great deal of efflux is required to offset the weight of the aircraft, in the same manner as a hovercraft.

Another WIG vehicle is shown in U.S. Pat. No. 4,151,893. As shown in FIG. 16 of this patent, the efflux of the engines may be used to provide a cushion of air or a ram effect may be used when moving at a sufficient velocity. Both this device and the device described in the previous paragraph use the propulsion efflux in the hover mode, but a relatively large amount of energy is expended for this purpose.

Another type of aircraft using ground effect is shown in U.S. Pat. Nos. 3,124,322 and 3,412,956. While these aircraft fly in a normal aerodynamic mode most of the time, a ground effect procedure is used in landing and taking off. The efflux is carried by conduits to a series of slot-like openings on the bottom of the wing and fuselage. The efflux is blown downwardly through the slots to form a ground effect cushion. This vehicle does not use WIG concepts when flying, but when utilizing these concepts at takeoff and landing, is subject to the same problems as the two previously mentioned devices.

A more recent advance in WIG design avoids the necessity for such massive amounts of efflux to create the ground effect. The Power-Augmented Ram Wing-in-Ground Effect Vehicle (PAR-WIG), shown in FIG. 1, utilizes the efflux from the aircraft engines to form the air cushion during the entire flight of the aircraft. The engines are placed near the front of the vehicle and tilted so that the efflux blows under the front edge of each wing 12. The efflux is partially trapped under the wing by end plates 14 and movable trailing edge 16. A static pressure rise results under the wing, providing lift for the vehicle. The amount of lift is greater than the prior art devices due to the design of the propulsion system which entrains ambient air, hence filling the volume under the wing with high energy air. Tests have shown that the PAR-WIG cushion can be used with high wing loadings and relatively rough sea conditions, but requires relatively low thrust. Thus, this design is a large improvement over previous models. This design presents new problems, however, by the mounting of the engines near the nose of the aircraft. The engines are very vulnerable to the ingestion of salt spray and debris, both of which may damage the engines. Also, the structure of the aircraft must be more substantial in the nost section, causing an undesirable weight increase.

SUMMARY OF THE INVENTION

Accordingly, one object of this invention is to provide a WIG aircraft having the engines in a location safe from spray and debris ingestion.

Another object of this invention is to provide a WIG aircraft having a low structural weight.

A further object of this invention is to provide a WIG aircraft having a relatively high lift to thrust ratio.

Briefly, these and other objects of the invention are achieved by providing an aircraft having a slot along the front edge of each wing into which the efflux of the engines is directed from conduits running on either side of the slot so as to form a cushion under the wing.

BRIEF DESCRIPTION OF THE DRAWINGS:

A more complete appreciation of the invention will become apparent from the following detailed description when considered in connection with the accompanying drawings wherein.

DESCRIPTION OF THE PREFERRED EMBODIMENT

Figure 1:
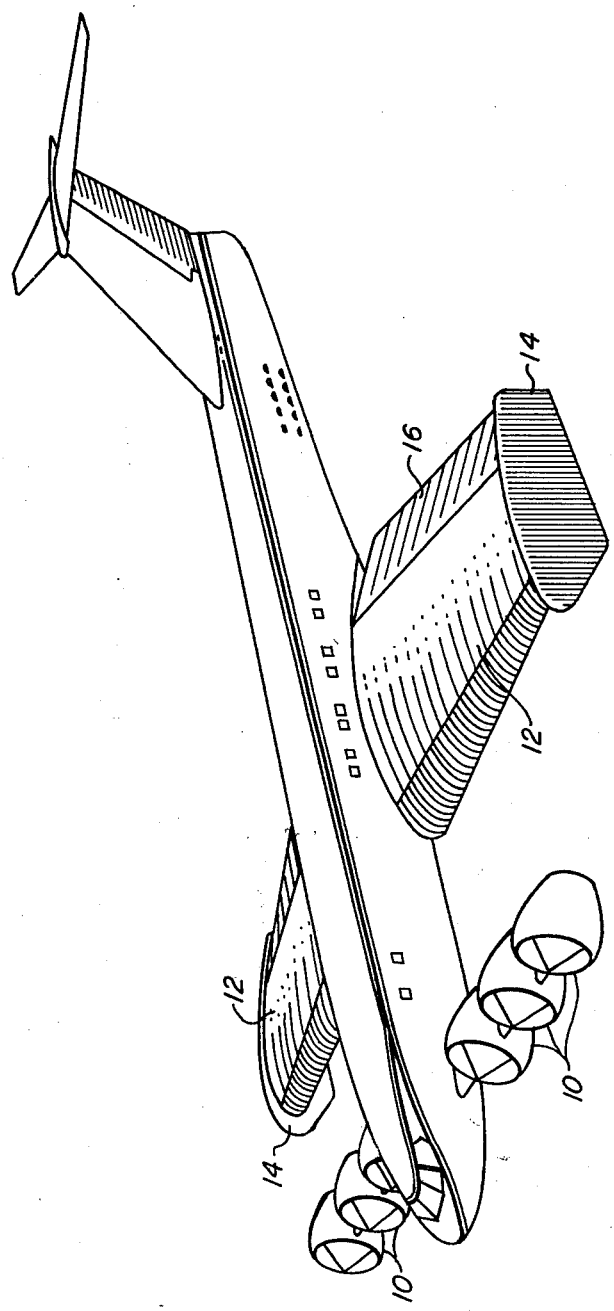
FIG. 1 is a prospective view of the prior art device.
Figure 2:
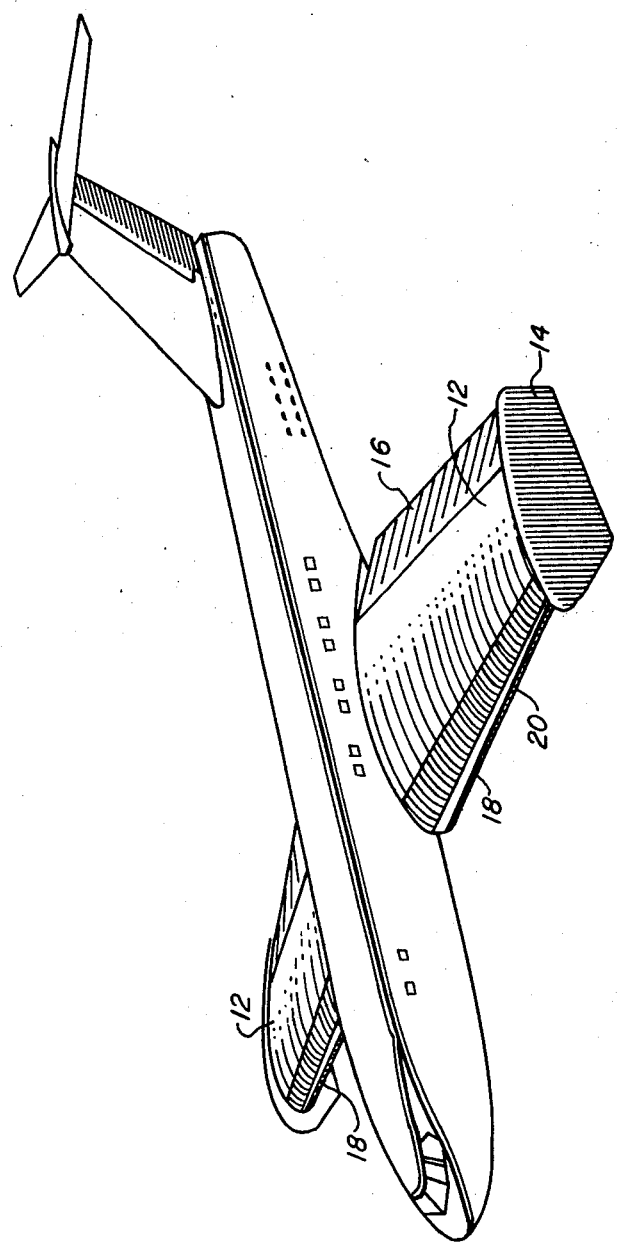
FIG. 2 is a prospective view of a first embodiment of the invention.

Referring now to the drawings wherein like reference characters designate identical or corresponding parts throughout the several views, and more particularly to FIG. 2 wherein the invention is shown as including a WIG aircraft having an opening 18 provided in the leading edge of each wing 12. The opening separates the main part of the wing from the leading edge portion 20. The engines are not shown, but could be mounted in any safe location, preferably within the fuselage near the center of the craft. Other aspects of the aircraft are similar to that of the prior art shown in FIG. 1, such as the end plates 14 and trailing edge 16 for trapping the air cushion.

Figure 3:
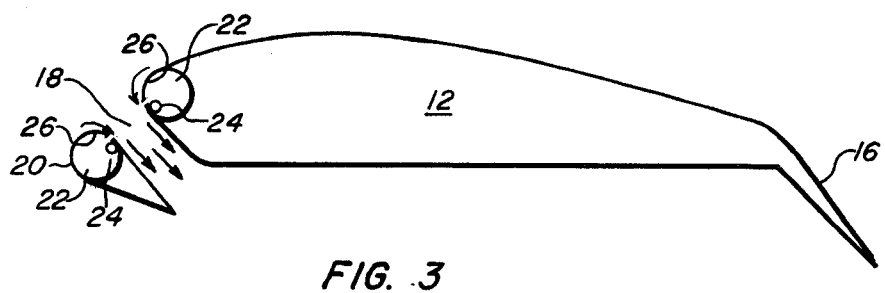
FIG. 3 is a cross sectional view of the wing of the first embodiment of the invention.

In place of nose mounted engines, an augmentor is arranged on the leading edge of the wing to provide the gas cushion on which the wing rides. The augmentor receives efflux from the engine and directs it to form the cushion. The efflux is ducted through conduits 22, shown in FIG. 3 as being inside the leading edge portion 20 and also inside the main part of the wing adjacent the opening 18. Inside each conduit, an elongated tubular member 24, which may be solid or hollow, is placed adjacent to a slot 26 running the length of the opening 18.

As the efflux travels through the conduit, a portion of the gas escapes through slot 26. The presence of member 24 directs the flow so that the escaping gas forms a stream tangential to the conduit and travels along the edge of the opening 18. With a stream of gas traveling down both edges, a Coanda effect is generated causing ambient air to be sucked into the opening and entrained with the efflux. This combination of gases is then trapped beneath the wing to form a cushion on which the aircraft rides. Some gas may be allowed to escape beneath the bottom edge of movable trailing edge part 16 in order to provide forward thrust. In addition, a propeller or other device may be used to add additional thrust. Thus, the end result of a mixture of efflux and entrained air beneath the wing is the same as in the prior art PAR-WIG shown in FIG. 1, but without the necessary evils brought on by the location of engines as the nose of the aircraft. Likewise, the present invention provides more thrust from a smaller power plant by entraining ambient air than conventional WIG devices, just as the PAR-WIG does.

Since the width of the wing varies along its span, the volume of gas needed beneath the wing also varies along its span. In order to compensate for this, the distance between the two parts of the wing may be different along the length of the opening 18. Also, the size of the slot 26 may vary to increase the flow. Similarly, since the pressure inside the conduit may be lower nearer the wing tips, it may be necessary to make the slot wider in proportion to the drop in pressure.

While the invention works best with a conduit on each side of opening 18, it may also be configured with only a single conduit. However, it has been found that the flow is much smaller with only a single conduit, and the ambient air is not as easily entrained.

Figure 4:
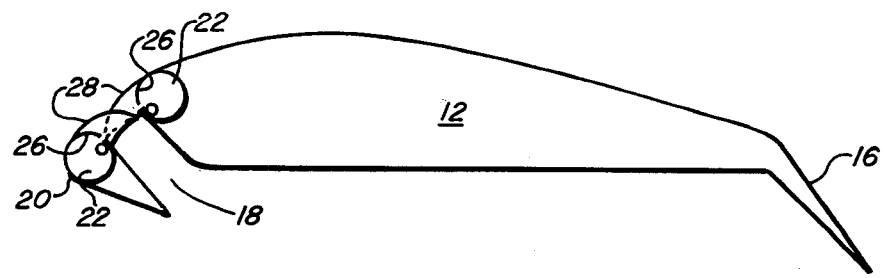
FIG. 4 is a cross sectional view of the wing of the second embodiment of the invention.
Figure 5:
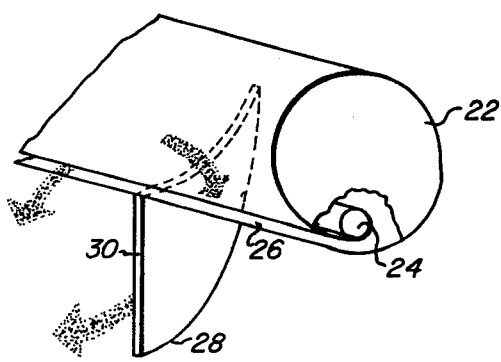
FIG. 5 is a schematic of the air flow through the augmentor in the second embodiment of the invention.
Figure 6:
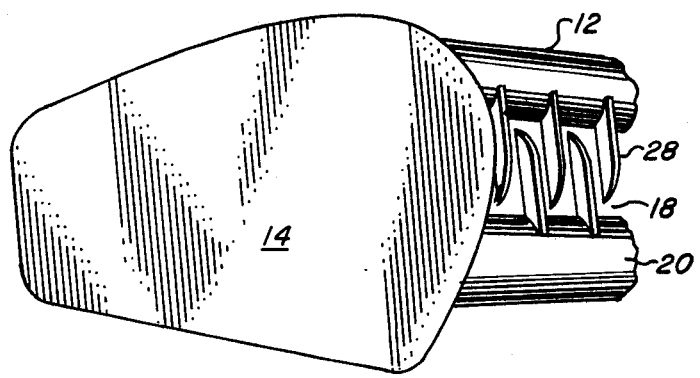
FIG. 6 is a prospective view of the wing of the second embodiment of the invention.

A second embodiment of the invention is shown in FIGS. 4-6 as including a similar arrangement of parts but with the addition of further openings 28 in the conduit in the shape of shark fins. As best shown in FIG. 5, the shark fin has a relatively straight vertical back edge with an opening 30 running the length of this edge. The front edge follows roughly a 90° portion of circle or any similar curve which turns from a near vertical to near horizontal direction. The top edge follows the curve of the outside of conduit 22 and is attached thereto. The top edge is open and the conduit has a corresponding opening so that the conduit and shark fin are in fluid communication.

In this embodiment, the efflux from the engines travels down the conduit and escapes through slot 26 as in the first embodiment, and in addition travels into the top of the shark fin and out the opening 30 on the back edge. Thus, the flow in opening 18 is not only down both sidewalls, but also down the center at spaced intervals. As seen in FIG. 6, the fins are relatively thin so as not to block the inflow of ambient air and also spaced apart a relatively large distance. The fins alternate on the top and bottom but, as shown in FIG. 4, since both fins almost touch the opposite side, the flow from each is very similar. While the fins are shown as being of equal size and distance apart, this may be varied to compensate for the different volume required under different parts of the wing or for any other desired effect.

By providing additional flow paths, the shark fin embodiment is even more efficient than the first embodiment in entraining relatively more air due to the greater area over which the flow is spread. However, either embodiment accomplishes improved results over the prior art devices.

The location of the engines within or on top of the fuselage provides for greater safety of the engine from ingestion of debris or salt spray. Further, it is an easy matter to add devices to filter out the spray and debris when the engines are mounted in this location. In the PAR-WIG the mounting of such devices is difficult since this adds additional weight to the nose of the plane.

The present invention also allows a much lighter structural construction and avoids the control problems associated with thrust being applied to the nose in a partially upward direction. The invention also allows the use of some plastic parts instead of metal parts, due to the resultant low pressure differentials used, which do not corrode and are lighter in weight. In addition, the present invention gives more uniformity to the pressure distribution under the wing, delaying the onset of flow reversal of the gas under the wing.

It is possible to design the leading part of the wing 20 so as to be rotatable and vary the direction of the resultant flow. However, since the angle for proper turbulent mixing is fairly critical, this additional capability would generally not be very important. It is also possible to include intermediate supports as needed along the wing to keep the leading part 20 and the main part 12 of the wing at desired distances apart.

Numerous additional modifications and variations of the present invention are possible in light of the above teachings. It is therefore to be understood that within the scope of the appended claims, the invention may be practiced otherwise than as specifically described herein.

What is claimed is:

1. A ground effect vehicle comprising:
   an aerodynamic body including two wings extending in opposite directions from the sides of said body;
   each of said wings being formed of a main part and a stationary leading edge part separated by a wing opening;
   said main part and said leading edge part each enclosing a conduit extending the spanwise length of said part adjacent said wing opening;
   each of said conduits having a conduit opening in the form of a slot extending spanwise along said conduit and into said wing opening;
   at least one engine being connected at the exhaust end to said conduits so that efflux from said engine is ducted through said conduits and into said wing opening through said conduit opening;
   said wing opening varying in width along its spanwise length to compensate for varying sizes of wing surface and pressure differentials along said conduit opening;
   said conduits containing deflector means mounted within said conduits to direct the flow out of said conduit opening along the walls of the wing opening so that said flow forms a boundary layer along said walls creating a Coanda effect and entraining ambient air to flow with said boundary layer through said wing opening and under said wing; and
   each of said wings further containing an end plate extending downwardly from the ends of said wings and a trailing edge portion extending downwardly from the rear edge of said wings, wherein said end plate and trailing edge part contain most of the flow from said wing opening to form a cushion which supports said wing in ground effect, but where some of the flow escapes beneath the trailing edge part to provide forward thrust.

2. A ground effect vehicle according to claim 1, further comprising:

conduit extensions extending from each of said conduits across said wing opening, being in fluid communication with said conduit so that flow from the conduit is carried through said conduit extensions and out conduit extension openings so that additional sheets of flow extending across said wing opening travel through said wing opening to entrain further ambient air.

* * * * *